United States Patent [19]

Kiefer

[11] Patent Number: 5,312,198
[45] Date of Patent: May 17, 1994

[54] JACK EXTENSION TUBE

[75] Inventor: James Kiefer, Grand Rapids, Mich.

[73] Assignee: RAN Enterprises, Inc., Grand Rapids, Mich.

[21] Appl. No.: 998,560

[22] Filed: Dec. 29, 1992

[51] Int. Cl.$^5$ .................. B21D 53/24; B21D 39/00; B23P 11/00; B23P 17/00

[52] U.S. Cl. .................. 403/43; 403/274; 403/301; 411/408; 29/505

[58] Field of Search .......... 403/43, 48, 274, 300, 403/302, 308, 301; 411/408, 427; 29/505

[56] References Cited

U.S. PATENT DOCUMENTS

| | | |
|---|---|---|
| 1,123,616 | 1/1915 | Stewart . |
| 1,246,456 | 11/1917 | Parpert . |
| 1,891,785 | 12/1932 | Siebert et al. . |
| 1,917,502 | 7/1933 | Crawford et al. . |
| 1,964,258 | 6/1934 | Graham . |
| 2,157,354 | 5/1939 | Sherman . |
| 2,323,758 | 7/1943 | Temple, Jr. . |
| 2,420,364 | 5/1947 | Espenas ............ 403/48 |
| 3,125,149 | 3/1964 | May . |
| 3,209,575 | 10/1965 | Woodward, Jr. et al. . |
| 3,429,171 | 2/1969 | Feher . |
| 3,501,828 | 3/1970 | Schultz . |
| 3,513,684 | 5/1970 | Price . |
| 3,590,464 | 7/1971 | Wildi et al. . |
| 4,095,450 | 6/1978 | Opland et al. . |
| 4,121,528 | 10/1978 | Amado, Jr. . |
| 4,419,804 | 12/1983 | Axthammer ............ 29/434 |
| 4,461,063 | 7/1984 | Patton . |
| 4,582,259 | 4/1986 | Hoover et al. . |
| 4,688,415 | 8/1987 | Pendelton . |

FOREIGN PATENT DOCUMENTS

| | | |
|---|---|---|
| 497 | of 1892 | United Kingdom . |
| 353923 | 7/1931 | United Kingdom ........ 403/302 |
| 627834 | 8/1949 | United Kingdom ........ 403/301 |

OTHER PUBLICATIONS

Photographs of hinge arm referred to in FIGS. 15-17 of application, which was manufactured and sold by RAN Corporation more than one year ago.

*Primary Examiner*—Randolph A. Reese
*Assistant Examiner*—Christopher J. Novosad
*Attorney, Agent, or Firm*—Price, Heneveld, Cooper, DeWitt & Litton

[57] ABSTRACT

A jack extension tube for use on power seat adjuster mechanisms for vehicles is provided comprising an elongated tube having a first section and a second section spaced from the first section. A threaded member includes a knurled outer surface and is frictionally retained in the first section by inwardly extruding the tube onto the threaded member, the threaded member being engageable longitudinally from one end of said tube by a jack screw. The second section of the tube includes a pair of transversely oriented opposing apertures formed in the tube sidewalls and adapted to receive a pin-like member or fastener. The material defining the apertures is extruded in the transverse direction followed by collapsing the tube sidewalls so that the opposing flanges abut one another. Thus, the flanges provide a continuous, enlarged, work-hardened bearing surface to support the pin-like member or fastener.

17 Claims, 2 Drawing Sheets

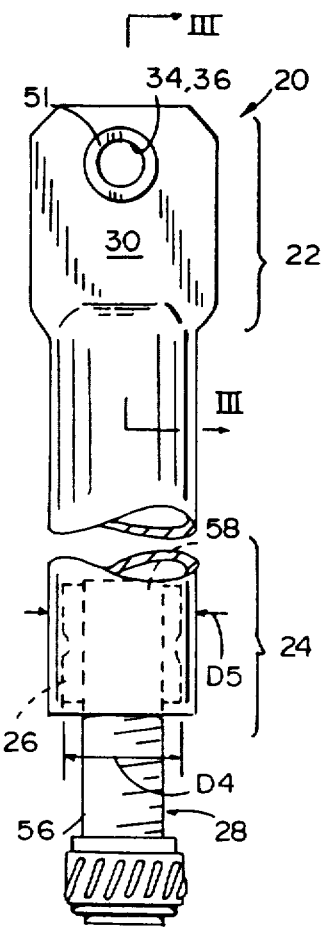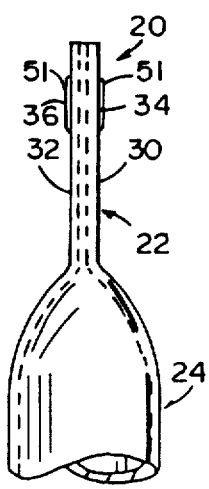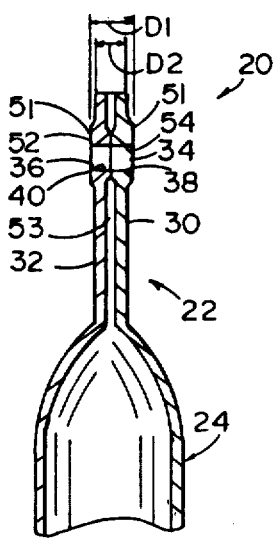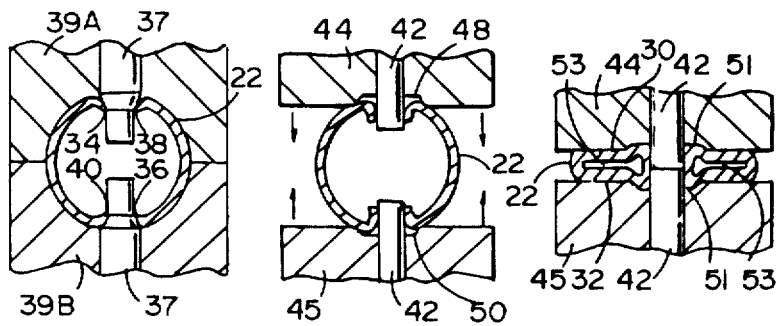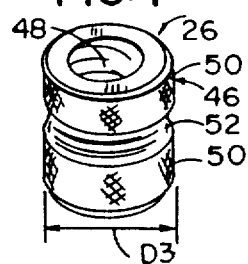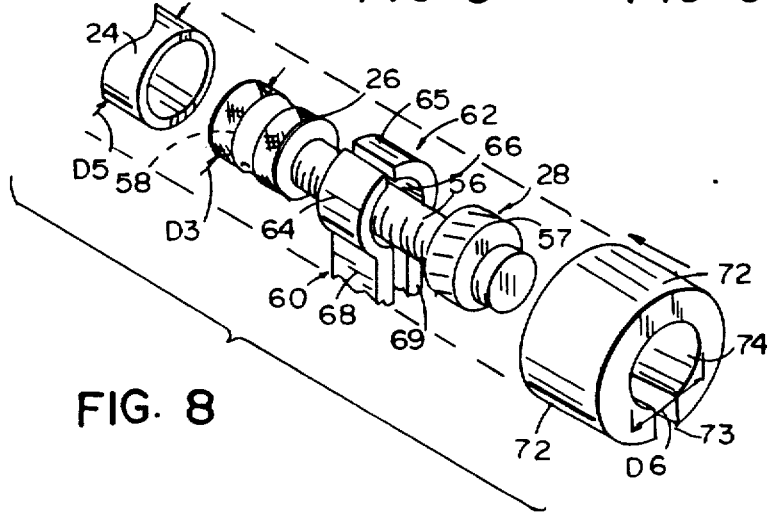

JACK EXTENSION TUBE

BACKGROUND OF THE INVENTION

The present invention concerns a jack extension tube for use on power seat adjuster mechanisms for vehicles, and in particular, to a jack extension tube having improved strength and fatigue resistance Jack extension tubes are used in power seat adjuster mechanisms for vehicles to operably connect a vehicle seat to a powering mechanism to move the seat. By varying tube length, jack extension tubes allow a particular seat adjuster mechanism to be used with seats on different vehicle models. Further, the tubular oonstruction allows cost savings and weight savings over solid rod-like parts. However, some prior art jack extension tubes have been known to fail due to stresses that occur as the seat adjuster mechanism is used and/or as people repeatedly sit on the vehicle seat.

Two known prior art jack extension tubes in particular are described in this application in the attached Figures. In both of these jack extension tubes, one end includes a pair of punched or drilled transverse holes, and the other end includes a nut that is press-fit into the tube, after which the tube is clinched to further secure the nut in place. However, the material forming the holes tends to tear or fatigue and prematurely fail. Also, the nut tends to prematurely fail by pulling out and/or by loosening over time.

Thus, an improved jack extension tube with improved strength solving the aforementioned problems is desired.

SUMMARY OF THE INVENTION

The present invention includes a jack extension tube for use on power seat adjuster mechanisms for vehicles. In one aspect, the jack extension tube includes a longitudinally extending tube having a first section and a second section spaced from the first section. A threaded member is retained in the first section and includes threads adapted to be engaged longitudinally from one end of the tube by a jack screw The second section includes material defining a pair of aligned opposing apertures adapted to receive a pin-like member or self-tapping screw, the pair of apertures defining a direction transverse to the longitudinal direction of the tube. The material defining the apertures is extruded in the transverse direction so as to form opposing flanges defining enlarged, cylindrically-shaped surfaces that provide an enlarged, work-hardened, bearing surface to support the pin-like member when the pin-like member is received therein. This increases the wear resistance and fatigue resistance of the second section, thus allowing the tube to be operably connected to the seat by the pin-like member and the jack screw to be threaded into the threaded member and rotated by a powering device so as to control the movement of the vehicle seat.

In another aspect, the jack extension tube includes a first section and a second section spaced from the first section, the first section defining a first inner diameter. A threaded member is located in the first section and includes a knurled outer surface defining a second diameter about equal to the first inner diameter. The threaded member is frictionally retained in the first section by the first section being inwardly extruded onto the threaded member such that the first section is forced into close engagement with the knurled outer surface. The second section includes means for securing a pin-like member therein so that the jack extension tube can be operably connected between a vehicle seat and a vehicle seat adjuster mechanism.

The preferred embodiments of the present invention include several advantages over known prior art. The threaded nut-like member is frictionally retained by inwardly extruding the tube onto the nut. This provides a significant increase in tensile pullout strength of the connection over known jack extension tubes, the increase being about double the tensile pullout force of the prior known devices. Also, the transversely extruded holes also provide an improved connection which is much more resistant to fatigue failure from cyclical loading or tensile failure. Also, the extruded hole arrangement provides a thread strip-out torque of about double the previous thread strip-out torque over non-extruded holes where self-tapping screws are used.

These and other features, advantages and objects of the present invention will be further understood and appreciated by those skilled in the art by reference to the following specification, claims and appended drawings.

BRIEF DESCRIPTION OF THE DRAWINGS

FIG. 1 is a broken side view of a jack extension tube embodying the present invention;

FIG. 2 is a fragmentary side view of the jack extension tube in FIG. 1 but taken orthogonally to FIG. 1;

FIG. 3 is a sectional view taken along the plane III-—III in FIG. 1;

FIG. 4 is a sectional schematic view showing the piercing of opposing apertures in the tube and the extruding of flanges around the apertures;

FIGS. 5–6 are sectional schematic views showing the collapsing of the flattened end of the tube while causing the inwardly extruded flanges to abut and also while forming embossments around the apertures;

FIG. 7 is a perspective view of a threaded nut like member of the type used in the present invention;

FIG. 8 is a perspective view of the jack extension tube including the raw tube, the threaded member and jack screw, the die halves for inwardly extruding the tube onto the threaded member, and the doughnut-shaped extruding-die driver;

FIGS. 11—12 and FIGS. 13—4 are side and orthogonal views of two known, prior art jack extension tubes;

DESCRIPTION OF PRIOR ART

Figure 11:
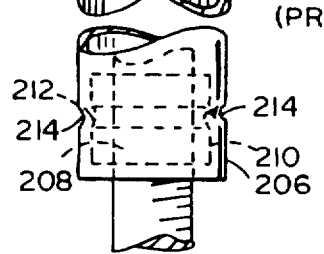

A known jack extension tube 200 (FIGS. 11 and 2) of prior art includes a metallic tubular section having a flattened end 202 with a drilled or punched transverse hole 204 located therein and also includes a second end 206 spaced from flattened end 202. Second end 206 has a predetermined inner diameter, and is configured so that it can press-fittingly receive a cylindrically-shaped nut 208 with knurled outer surface 210. After the press fitting, second end 206 is clinched at opposing locations 214 to force tube material partially into ring-like groove 212 in nut 208 so as to provide additional frictional resistance to movement of nut 208 in tube 200.

Figure 13:
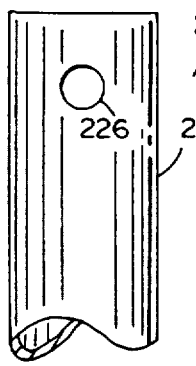
Figure 14:
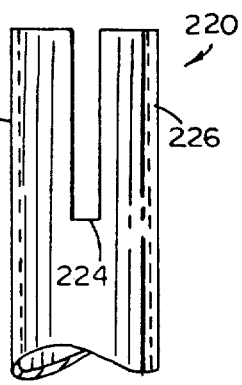

A second known jack extension tube 220 (FIGS. 13 and 14) of prior art includes a metallic tubular section having an end 222 with a pair of slits 224 therein for receiving a flat blade-like member (not shown). A pair of aligned holes 226 are drilled or punched in end 222 perpendicular to slits 224 so that a bolt (not shown) can be extended through holes 226 and through the flat member to retain the flat member in slits 224 in end 222. The other end of tube 220 is substantially the same as end 206 in tube 200.

Figure 15:
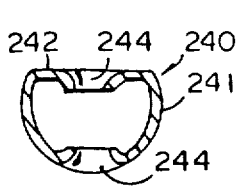
FIGS. 15-16 are cross sections taken from the prior art tubular hinge arm shown in FIG. 17.
Figure 16:
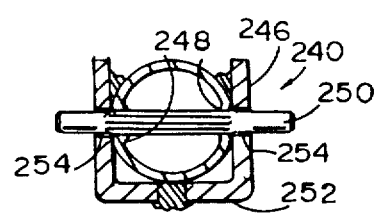
Figure 17:
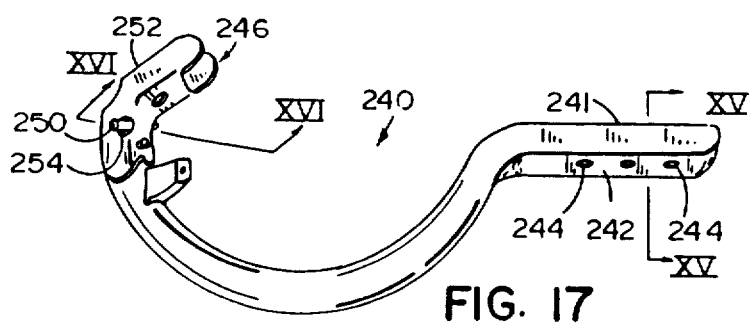
FIG. 17 is a side view of a prior art tubular hinge arm.

A prior art tubular hinge arm 240 is shown in FIG. 17, and two cross sections of the prior art tubular hinge arm 240 are shown in FIGS. 15 and 16. The first cross section (FIG. 15) is taken through a first end 241 and includes a flat side 242. A pair of opposing aligned holes 244 are pierced and extruded inwardly on the tube before the tube is flattened, after which flat side 242 is formed with one of the holes 244 ending up on the flat side 242. Holes 244 are used to threadably receive a self-tapping screw (not shown) to secure the hinge arm 240 to a vehicle body panel. Tubular hinge arm 240 further includes a second end 246 for which a second cross section is shown in FIG. 16. As shown, two aligned holes 248 are extruded inwardly and a pivot pin 250 with longitudinal serrations is press-fit therein. A bracket 252 is spot welded to the second end. Bracket 252 stiffens tube end 246 but does not support pivot pin 250 directly since it includes enlarged holes 254 that space bracket 252 away from pivot pin 250.

DETAILED DESCRIPTION OF THE PREFERRED EMBODIMENT

Figure 12:
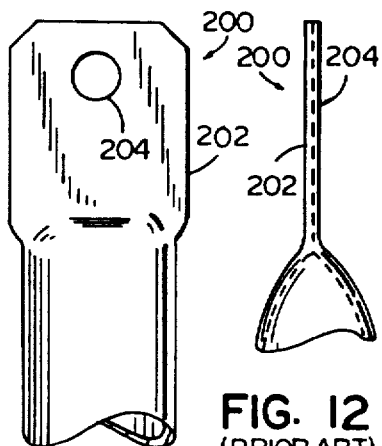

A jack extension tube 20 (FIGS. 1-3) embodying the present invention includes a first end 22 adapted to be operably connected to a vehicle seat (not shown) and a second end 24 with a threaded nut like member 26 frictionally secured therein. A jack screw 28 is operably received in the threaded member so that by operating a seat adjuster powering mechanism (not shown) connected to the jack screw 28, the jack screw 28 is rotated thus causing the jack extension tube 20 to extend/retract to reposition the vehicle seat as desired. Jack extension tube 20 is constructed so as to exhibit improved tensile strength and fatigue resistance over prior known jack extension tubes such as that shown in FIGS. 11, 12 herein while providing manufacturability for consistent manufacture.

More particularly, first end 22 (FIGS. 1-3) is generally formed by extruding aperture-forming flanges in tube 20 and then deforming or collapsing tube sidewalls 30 and 32 toward each other until the extruded flanges formed in sidewalls 30 and 32 contact each other. Specifically, before the step of collapsing and while tube end 22 is still in the round, apertures 34 and 36 are punched into tube end 22 by opposed punches such as those shown at 37 (FIG. 4). This is accomplished by supporting the outside surface of the sidewalls of tube end 22 during the step of punching, such as by stabilizing the tube end 22 with die halves 39A and 39B. At the same time (or in a separate step), apertures 34 and 36 are extruded inwardly to form inwardly oriented flanges 38 and 40. One or more pilot pins 42 are then placed through apertures 34 and 36 (FIG. 5), and sidewalls 30 and 32 are pressed together with sufficient force such as by dies 44 and 45 to cause sidewalls 30 and 32 to collapse substantially flat and proximate each other but spaced apart slightly (FIG. 6). Deforming dies 44 and 45 include a pair of recesses 48, 50 for forming an embossment 51 on each sidewall 30, 32 around each apertures 34 and 36, embossments 51 assisting in the reverse extrusion process noted below so that wall section 52 is fully formed.

Notably, as sidewalls 30 and 32 are collapsed (FIG. 6) and/or as the punch 42 is withdrawn (FIG. 4), material around apertures 34 and 36 is reverse extruded and forced to form a substantially continuous cylindrical tubular wall section 52 (FIG. 3) Wall section 52 defines an enlarged surface area 54 having a thickness D1 that is about equal to or greater than the total thickness D2 of sidewalls 30 and 32 plus the space 53 therebetween. The extrusion and reverse extrusion also work-hardens wall section 52 providing increased strength. Also, the enlarged surface area 54 defining apertures 34 and 36 provides an increased bearing surface area, which area has increased wear resistance for pivotal attachment of a vehicle seat such as by a pin or shoulder bolt shaft or self-tapping screw or other fastener. Notably, wall section 52 provides an enlarged surface engageable by a self-tapping screw or fastener, the enlarged area serving to increase the thread strip resistance of the assembly as the self-tapping screw is torqued into position. For example, in testing, wall section 52 has provided a strip torque of about 40-50 NM, as compared to the strip torque of the prior art device shown in FIGS. 11, 12 of about 22 NM.

Threaded nut-like member 26 (FIG. 7) includes a cylindrically-shaped outer surface 46 and a threaded inner hole 48, the threads in hole 48 being configured to mateably engage the threaded shaft of jack screw 28. Outer surface 46 includes serrated rings 50 separated by a groove-like ring 52. Notably, member 26 can be several different lengths depending upon design requirements. The diameter D3 of outer surface 46 is such that member 26 can be press-fit into the inner diameter D4 of second end 24 of tube 20.

Jack screw 28 (FIGS 1 and 8), with which the present invention is designed for use, includes a threaded shaft 56 adapted to engage the threads in hole 48 of threaded member 26, and a spiral gear 57 for engaging the seat adjuster powering mechanism. The end 58 opposite spiral gear 57 is peened over or otherwise is configured so that jack screw 28 cannot be fully unscrewed out of threaded member 26. Thus, jack screw 28 is limited in its longitudinal, fore-to-aft movement in threaded member 26.

In the present invention, second end 24 of jack extension tube 20 is inwardly extruded onto threaded nut-like member 26. By this method, the tensile strength of threaded member 26 in tube end 24 (i.e., the frictional resistance of threaded member 26 from being pushed/pulled out of tube end 24) has been found to be 5000 pounds force or more. This compares to about 2200 pounds under the prior art device shown in FIG. 11 and discussed earlier (i.e., wherein the nut was press-fit and clinched).

The process of inwardly extruding second end 24 is illustrated in FIG. 8 and includes press-fittingly positioning nut 26 within tube second end 24 with jack screw extended a distance out of nut 26. A pair of finger-like extruding members 60 and 62 are shaped to mateably close against each other on tuber end 24. Members 60 and 62 include upper portions 64 and 65 which close to define an aperture 66 and lower portions 68 and 69 for manipulating upper portions 64 and 65. When closed together, aperture 66 defines a shape having a diameter less than outer tube diameter D5 of tube end 24. A doughnut-shaped sleeve-like driver die 72 includes an aperture 74 having an inside diameter D6 greater than spiral gear 57 so that it can slip longitudinally over the end of jack screw 26 onto upper portions 64 and 65. The inner diameter D6 of driver die 72 and the thickness of upper portions 64 and 65 are predetermined so that driver die 72 mateably compresses upper portions 64 and 65 against tube end 24 as driver die is moved onto upper portions 64 and 65 over tube end 24. Also, driver die 72 includes a slot 73 therein shaped to receive lower portions 68 and 69 to prevent interference with extruding members 60 and 62 during the extruding operation.

With threaded nut-like member 26 inserted into tube end 24, extruding members 60 and 62 are closed onto tube end 24 and driver 72 is extended over spiral gear 57 onto extruding members 60 and 62. Driver 72 thus forces extruding members 60 and 62 inwardly onto tube end 24 thus inwardly extruding the material of tube end 24 onto threaded nut like member 26. In particular, material of tube end 24 is forced into close engagement with the knurled surface on serrated rings 50 and into groove-like ring 52 on all sides thereof. This close engagement provides uniform and substantially complete contact against the perimeter of threaded nut like member 26, thus assuring increased strength and durability and long life Once driver 72 is removed, extruding members 60 and 62 are separated and readied for the next part to be processed.

Figure 9:
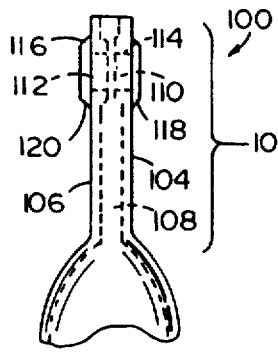
FIG. 9 is a fragmentary side view of a modified jack extension, tube.

In the preferred form, it is contemplated that the jack extension tube 20 will be about 10 inches long and extendable to about 12 ¼ inches, however the invention is contemplated to include various length tubes either shorter or longer and having shorter or longer extension lengths. In the preferred form, it is contemplated that the tube will be made from SAE 1018 HR-RW tube of about 0.875 inch outside diameter and 16 gauge wall thickness, however the invention is contemplated to include tubes of various diameters, wall thicknesses and material composition. For example, the tube could also be made of aluminum A modified jack extension tube 100 (FIG. 9) embodying the present invention is substantially similar to jack extension tube 20, but jack extension tube 100 includes flattened end 102 wherein a space 108 is left between both sidewalls 104 and 106 and also between extruded flanges 114 and 116 formed in sidewalls 104 and 106. Specifically, inwardly extruded apertures 110 and 112 in flattened sidewalls 104 and 106 are defined by the inwardly extruded flanges 114 and 116, with flanges 114 and 116 being positioned proximate each other but not in abutting contact (FIG. 9) Notably, embossments 118 and 120 are formed on the exterior of sidewalls 104 and 106 by reverse extrusion as punch 37 is withdrawn (i.e., similar to FIG. 4) and/or as the sidewalls 104 and 106 are flattened (i e., similar to FIGS. 5–6). If necessary, an insert (not shown) can be placed in the end of tube end 102 to support flanges 114 and 116 in their spaced condition during the step of collapsing tube end 102.

Figure 10:
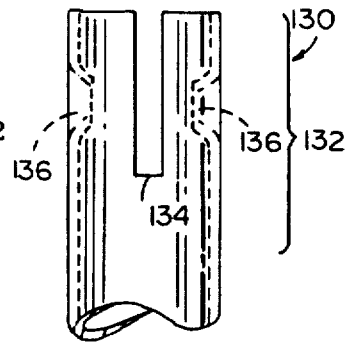
FIG. 10 is a fragmentary side view of another tube.

Another modified jack extension tube 130 embodying the present invention is shown in FIG. 10. Jack extension tube 130 does not include a flattened end, but rather includes a slotted end 132 with a pair of slots 134 aligned across a diameter of the tube for receiving a flat blade-like member (not shown) and a pair of inwardly extruded apertures 136 positioned radially perpendicular to slots 134 The flat blade-like member has a thickness so that it can be positioned in slots 134, and further includes an attachment hole so that a bolt or screw can be extended through apertures 136 to secure the flat member in place. It is contemplated that apertures 136 can be reverse extruded or embossed, as previously described in relation to jack extension tubes 20 and 100, depending upon the functional requirements of the particular part being manufactured.

Thus, there is provided jack extension tubes having improved ends providing a more durable and stable attachment. In one end, the jack extension tubes include inwardly extruded holes, which may be formed against each other for improved structure and strength. In the other end, the jack extension tubes include an inwardly extruded portion that closely engages a threaded nut-like member positioned therein, the inwardly extruded portion exhibiting improved frictional tensile strength for holding the threaded nut-like member in place.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. A jack extension tube for vehicles, comprising:
an elongated tube having a first section and a second section spaced from said first section;
a threaded member retained in said first section, said threaded member including threads adapted to be engaged longitudinally from one end of said tube by a jack screw and further including an irregular outer surface, said first section of said elongated tube closely engaging said irregular outer surface to frictionally immovably retain said threaded member therein;
said second section including sidewalls with material defining a pair of aligned, opposing apertures adapted to receive a fastener, said pair of apertures defining a direction transverse to the longitudinal direction of said tube, said material defining said apertures being extruded in the transverse direction so as to form opposing flanges defining enlarged cylindrically-shaped surfaces that provide an enlarged work-hardened bearing surface which increases the wear resistance and fatigue resistance of the second section when a fastener is received therein.

2. A jack extension tube as defined in claim 1 wherein said opposing flanges abut so as to define a substantially continuous cylindrically-shaped surface.

3. A jack extension tube as defined in claim 2 wherein said material defining said apertures is extruded inwardly and then is reverse extruded so that said cylindrically-shaped surface extends outboard of said sidewalls.

4. A jack extension tube as defined in claim 3 wherein said material defining said apertures includes a raised embossment around said apertures on the exterior sides of said sidewalls.

5. A jack extension tube as defined in claim 4 wherein said first section is extruded inwardly onto said threaded member so that the material of said first section closely engages said threaded member to frictionally retain same therein.

6. A jack extension tube as defined in claim 1 wherein said second section includes sidewalls and said material defining said apertures is reverse extruded so that said cylindrically-shaped surface extends outboard of said second section sidewalls.

7. A jack extension tube as defined in claim 1 wherein said material defining said apertures includes a raised embossment around said apertures 8. A jack extension tube as defined in claim 1 wherein said first section is extruded inwardly onto said threaded member so that the material of said first section closely engages said threaded member on all sides thereof.

9. A jack extension tube as defined in claim 1 wherein said second section includes a pair of opposing longitudinally extending slots that divide said second section into opposing halves, said pair of slots being adapted to receive a flat blade-like member.

10. A jack extension tube as defined in claim 1 including a pin pivotally mounted in said apertures for fastening said tube to a vehicle component.

11. A jack extension tube for vehicles, comprising:
an elongated tube having a first section and a second section spaced from said first section;
a threaded member retained in said first section, said threaded member including threads adapted to be engaged longitudinally from one end of said tube by a jack screw, said threaded member including a knurled exterior surface contacting said first section of said tube, said first section being extruded inwardly onto said threaded member so that the material of said first section closely engages said threaded member to frictionally retain same therein; and
said second section including sidewalls with material defining a pair of aligned, opposing apertures adapted to receive a fastener, said pair of apertures defining a direction transverse to the longitudinal direction of said tube, said material defining said apertures being extruded in the transverse direction so as to form opposing flanges defining enlarged cylindrically-shaped surfaces that provide an enlarged work-hardened bearing surface which increases the wear resistance and fatigue resistance of the second section when a fastener is received therein, said opposing flanges abutting so as to define a substantially continuous cylindrically-shaped surface, said material defining said apertures being extruded inwardly and then being reversed extruded so that said cylindrically-shaped surface extends outward of said sidewalls, said material defining said apertures including a raised embossment around said apertures on the exterior sides of said sidewalls.

12. A jack extension tube for vehicles, comprising:
an elongated tube having a first section and a second section spaced from said first section;
a threaded member retained in said first section, said threaded member including threads adapted to be engaged longitudinally from one end of said tube by a jack screw;
said second section including material defining a pair of aligned, opposing apertures adapted to receive a fastener, said pair of apertures defining a direction transverse to the longitudinal direction of said tube, said material defining said apertures being extruded in the transverse direction so as to form opposing flanges defining enlarged cylindrically-shaped surfaces that provide an enlarged work-hardened bearing surface which increases the wear resistance and fatigue resistance of the second section when a fastener is received therein; and
a jack screw operably threadably extending into said threaded member, said jack screw including an exposed end defining a gear and an opposite end configured so that said jack screw is retained in said threaded member and cannot be fully unscrewed from said threaded member.

13. A jack extension tube for vehicles comprising:
an elongated tube having a first section and a second section spaced from said first section, said first section defining a first inner diameter;
a threaded member located in said first section, said threaded member including threads adapted to be engaged longitudinally from one end of said tube, said threaded member including a knurled outer surface defining a second diameter about equal to said first inner diameter, said threaded member being frictionally retained in said first section by said first section being inwardly extruded onto said threaded member such that said first section is forced into close engagement with said knurled outer surface; and
means for securing a fastener to said second section, said means for securing including inwardly extruded opposing flanges forming a pair of apertures.

14. A jack extension tube as defined in claim 13 wherein said tube has sidewalls having a particular wall thickness which are flattened so that said inwardly extruded flanges abut, said flanges also extending outwardly of the sidewalls to thus forming a substantially continuous cylindrical bearing surface having a length greater than double the wall thickness of said tube.

15. A jack extension tube as defined in claim 13 wherein said second section includes a pair of aligned, opposing, longitudinally extending slots which divide said second section into opposing halves, each half having one of said apertures, said pair of slots being adapted to receive a flat blade-like member and position the flat member between said pair of apertures.

16. A jack extension tube as defined in claim 13 including a pivot pin pivotally mounted in said apertures for fastening said tube to a vehicle component.

17. A jack extension tube for vehicles comprising:
an elongated tube having a first section and a second section spaced from said first section, said first section defining a first inner diameter;
a threaded member located in said first section, said threaded member including threads adapted to be engaged longitudinally from one end of said tube, said threaded m ember including a knurled outer surface defining a second diameter about equal to said first inner diameter, said threaded member being frictionally retained in said first section by said first section being inwardly extruded onto said threaded member such that said first section is forced into close engagement with said knurled outer surface;
means for securing a fastener to said second section; and
a jack screw operably threadably extended into said threaded member, said jack screw including an exposed end defining a gear and an opposite end configured so that said jack screw is retained in said threaded member and cannot be fully unscrewed from said threaded member.

* * * * *

UNITED STATES PATENT AND TRADEMARK OFFICE
CERTIFICATE OF CORRECTION

PATENT NO. : 5,312,198
DATED : May 17, 1994
INVENTOR(S) : James Kiefer

It is certified that error appears in the above-indentified patent and that said Letters Patent is hereby corrected as shown below:

Column 1, line 8;
  After "resistance" insert --.--.

Column 1, line 14;
  "oonstruction" should be --construction--.

Column 1, line 42;
  After "screw" insert --.--.

Column 2, line 49;
  After "another" insert --modified jack extension--.

Column 2, line 50;
  "Figs. 13--4" should be --Figs. 13-14--.

Column 2, line 56;
  "(Figs. 11 and 2)" should be --(Figs. 11 and 12)--.

Column 5, line 8;
  After "driver die" insert --72--.

UNITED STATES PATENT AND TRADEMARK OFFICE
CERTIFICATE OF CORRECTION

PATENT NO. : 5,312,198
DATED : May 17, 1994
INVENTOR(S) : James Kiefer

It is certified that error appears in the above-indentified patent and that said Letters Patent is hereby corrected as shown below:

Column 5, line 27;
      After "life" insert —.—.

Column 5, line 41;
      After "aluminum" insert —.—.

Column 5, line 67;
      After "slots 134" insert —.—.

Column 7, claim 7, line 6;
      After "apertures" insert —.—.

Signed and Sealed this

Eighth Day of October, 1996

Attest:

BRUCE LEHMAN

Attesting Officer      *Commissioner of Patents and Trademarks*